United States Patent [19]

Vasquez

[11] 4,410,023
[45] Oct. 18, 1983

[54] WORK HOLDER

[76] Inventor: Jesus G. Vasquez, 5601 D St., Chino, Calif. 91710

[21] Appl. No.: 267,194

[22] Filed: May 26, 1981

[51] Int. Cl.³ .............................................. B25H 1/00
[52] U.S. Cl. .................................................... 144/287
[58] Field of Search ................. 83/157, 373, 648, 701;
144/286 R, 286 A, 287; 269/17, 296, 55, 71, 13;
182/181, 179

[56] References Cited

U.S. PATENT DOCUMENTS

| | | | |
|---|---|---|---|
| 103,347 | 5/1870 | Lepp | 144/286 R |
| 2,311,668 | 2/1943 | Kennedy | 269/17 |
| 2,933,966 | 4/1960 | Dehn | 83/373 |
| 3,763,958 | 10/1973 | Hanson | 182/181 |
| 3,850,264 | 11/1974 | Salinas | 182/179 |
| 3,908,980 | 9/1975 | Fowler | 83/157 |
| 4,068,551 | 1/1978 | Kreitz | 144/286 R |
| 4,248,115 | 2/1981 | Brodbeck et al. | 144/286 R |

Primary Examiner—Robert C. Watson
Attorney, Agent, or Firm—Henry M. Bissell; Edward B. Johnson

[57] ABSTRACT

An improved work holder for use with a shearing or cutting machine is provided which includes a heavy tray stationary base, two or more spaced fixed upright supports secured to the base, cross-braced to each other and bearing aligned support brackets and a forwardly extending generally horizontal support arm slidably disposed in the brackets for reciprocating into and out of a workpiece supporting position within the machine between the machine's cutter and backstop. A forwardly extending handle is secured to the upper end of a vertical rod spaced laterally of the arm and secured thereto by a cross-bar. The lower end of the rod holds a rotatable ground traversing wheel, so that reciprocation of the handle reciprocates the arm into and away from the workpiece supporting position. A workman is able to manipulate the handle while a workpiece, such as a thin flat flexible sheet of metal, is in place in the machine for cutting. The arm is alternately advanced to support the sheet against bending before and during cutting and retracted to allow the cut portion of the sheet to drop away from the cutting area. In order to increase the support efficiency of the arm, its end can include an adjustable extension. The holder is simple, durable, inexpensive, efficient and effective in operation.

9 Claims, 4 Drawing Figures

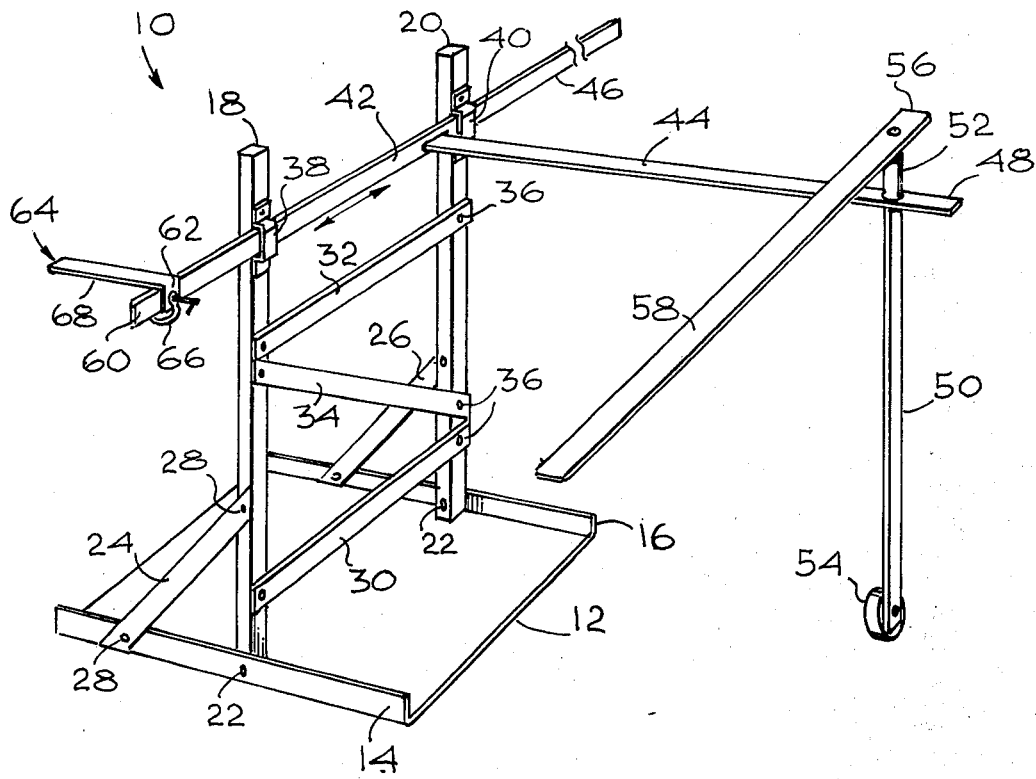

WORK HOLDER

BACKGROUND OF THE INVENTION

1. Field of the Invention

This invention generally relates to work holders, and more particularly, to an improved work holder for a cutting or shearing machine or the like.

2. Description of the Prior Art

When relatively large, flat, thin flexible sheets of metal, plastic or the like are cut or sheared in a cutting or shearing machine, some difficulty is normally encountered because of sagging or bending of the portion to be cut or sheared before that operation takes place. Thus, although most of the sheet is supported on a table or platform outside the machine as it is being advanced to the machine's cutter, the end of the sheet that is fed into the machine between the cutter and the backstop of the machine is unsupported by the machine so that when it is cut it can drop away and clear the cutting area for the next portion to be advanced. It is that unsupported portion which tends to sag or bend. The sagging or bending interferes with properly executing clean, flat, sharp, accurate cutting of the sheet.

It would therefore be desireable to provide a simple, durable, inexpensive work holder which could give the sheet portion to be cut adequate support before and during cutting but which could be easily and temporarily removed to allow the cut-piece to drop away. Such a device should be capable of quick and ready manipulation to match the operation of shearing mills and the like.

Various supporting and holding mechanisms have been devised for specialized uses relating to the automobile manufacturing and repair industries. For example, U.S. Pat. No. 3,752,463 of Schilke and U.S. Pat. No. 4,029,308 of Mathers disclose respective devices particularly suited for use in handling hoods of motorized vehicles. U.S. Pat. No. 2,825,477 of Ross and U.S. Pat. No. 2,938,635 of Dyer disclose support mechanisms for facilitating removal, repair and replacement of vehicle engines, and may include a jack arrangement for lifting and supporting the vehicle as well as the engine during the automotive service operation. U.S. Pat. No. 2,827,690 of Brown and U.S. Pat. No. 4,183,511 of Marek relate to specialized holders for vehicle body panels, more specifically vehicle doors, during removal and repair operations.

All of these devices and mechanisms are particularly adapted to the singularly specialized functions which they are designed to perform. Most of them have particular elements incorporated in the mechanisms to facilitate their function, as for example wheels for moving jacks about, legs and frames for stands, arms or the like for positioning the particular items to be supported in the proper orientation to facilitate removal from or installation in or on a vehicle, gripping means, such as the suction cups of the Marek patent, for holding the supported device, and the like. Each of the structures of these respective patents is especially designed for a given function and is not adaptable to another, unrelated function.

Other patents which are known in the field of lifting and supporting mechanisms are the Schiltz U.S. Pat. No. 2,116,251 and the Crosslin U.S. Pat. No. 2,695,759. The Schiltz patent discloses a workholder for metal cutting machines which is designed to hold a workpiece in firm relationship to a machine for shaping the workpiece. The Crosslin patent discloses a lifting device for fiberboard, e.g. Sheetrock, in a manner which enables one man to operate it to move a fiberboard into position in a ceiling area and thereafter hold it in place while it is secured.

None of the prior art patents known to applicant discloses any mechanism remotely related to dealing with the problem faced by applicant in developing the structure of the present invention.

SUMMARY OF THE INVENTION

The present invention satisfies all of the foregoing needs. Thus, it comprises an improved work holder particularly adapted for use with cutting and shearing machines. The work holder is substantially as set forth in the accompanying Abstract. Thus, it includes a horizontal support arm connected to a handle and easily manually reciprocatable into and out of workpiece supporting position by a worker during operation of a cutting or shearing machine.

The arm is slidably disposed in the brackets of a spaced pair of stationary upright members secured to a heavy stationary base tray. The handle is lateral of, and parallel to, the arm and extends forward of the tray, as does the arm. The handle is connected at its rear end to a vertical rod, the lower end of which bears a ground traversing rotatable wheel. The rod is secured to the arm by a crossbar so that advancing of the handle—that is, pulling the handle toward a workman at the machine—causes the wheel to traverse the ground or floor and the crossbar to advance the arm toward the machine and into the workpiece supporting position. The forward end of the arm is dimensioned to fit into the space between the machine's cutter and its backstop and to hold generally horizontal the portion of the worksheet to be cut. To aid in this supporting function, the forward end of the arm can have an adjustable extension member connected to it. This extension member can be, for example, an angle iron clamped in place, or a hinged plate or the like, dimensioned to expand the support area under the sheet portion to be cut off.

After the portion of the sheet is cut, the handle is retracted, that is, pushed away from the workman standing at the machine and toward the tray and upright members of work holder 10, thus clearing the arm from its sheet supporting position and allowing the cut sheet to drop below the cutting area onto an exit slab, ramp or the like. The arm is then readvanced away from the tray and support members and toward the workman to support the next portion of the sheet to be fed into the machine for cutting. These operations can be done rapidly without the workman having to shift position. Thus, the device is simple, inexpensive, efficient and effective.

BRIEF DESCRIPTION OF THE DRAWINGS

A better understanding of the present invention may be had from a consideration of the following detailed description, taken in conjunction with the accompanying drawings in which:

FIG. 1 is a schematic perspective view of a preferred embodiment of the improved work holder of the present invention;

FIG. 2 is a schematic perspective view of the work holder of FIG. 1 shown in place next to a shearing machine, the arm of the work holder being in the advanced workpiece holding position;

FIG. 3 is a schematic fragmentary side elevation of a modified version of the workpiece holding extension disposed on the forward end of the support arm of FIG. 1; and FIG. 4 is a schematic fragmentary top plan view of the extension of FIG. 3.

DESCRIPTION OF THE PREFERRED EMBODIMENTS

FIGS. 1 and 2

Now referring more particularly to FIGS. 1 and 2 of the accompanying drawings, a preferred embodiment of the improved work holder of the present invention is schematically depicted therein. Thus, work holder 10 is illustrated as comprising a preferably heavy stationary base in the form of a metal tray 12 having two raised sides 14 and 16 at the front and rear thereof, respectively, to which a spaced parallel pair of vertical members 18 and 20 are secured, as by bolts 22 or rivets, screws, nails, welding, etc. Members 18 and 20 preferably are hollow rectangular tubes and are held in the upright position by braces 24 and 26 connected thereto and to sides 14 and 16, respectively, as by bolts 28. It will be understood that a single such brace could be used, if desired. Members 18 and 20 are held parallel with each other by spaced horizontal braces 30 and 32 and diagonal brace 34, each of which is secured to both members 18 and 20 by bolts 36, rivets, nails, screws, or the like. Members 18 and 20, braces 24, 26, 30, 32 and 34 and tray 12 preferably are of heavy gauge metal such as steel for rigidity, low cost, durability and efficiency.

Members 18 and 20 bear aligned steel straps or brackets 38 and 40 on one side thereof near the upper end thereof, and an elongated horizontal support arm 42 of steel or the like is slidably disposed through brackets 38 and 40. A horizontal crossbar 44 is connected to arm 42 adjacent the rear end 46 of arm 42 and extends laterally thereof at a 90° angle thereto. The free end 48 of bar 44 is connected to the upper portion of a vertical rod 50 through a vertical fitting 52, the lower end of rod 50 bearing a rotatable ground traversing wheel 54. The upper end of fitting 52 is connected to the rear end 56 of flat, forwardly extending, horizontal handle 58. Handle 58 extends farther forward than does arm 42 and is parallel thereto. Brackets 38 and 40, arm 42, crossbar 44, rod 50, wheel 54 and handle 58 can be fabricated of steel, or other metal or the like. Thus, work holder 10 is simple, is easily fabricated of inexpensive materials, and is durable.

The front end 60 of arm 42 can be provided, if desired, with an adjustable extension member 62. In this instance, member 62 is shown as an angle iron 64 bearing a right-angle bend therein and clamped to end 60 by a C-clamp 66 so that limb 68 of angle iron 64 extends horizontally laterally from the upper edge of arm 42 at end 60, in order to expand the workpiece supporting surface thereof. Thus, extension member 62 facilitates properly supporting a workpiece against sagging or bending.

Work holder 10 is shown schematically in FIG. 2 in place adjacent to a shearing machine 70, with member 18 nearest to machine 70 and with arm 42, particularly end 60 and extension member 62 thereof, inside machine 70 in a workpiece supporting position in the space 72 between the machine cutter 74 and the machine backstop 76. Handle 58 extends well above and across work platform or table 78 on which a thin, flat, flexible sheet of metal or plastic (not shown) can be shoved so that its front end extends into space 72 and abuts backstop 76 for cutting by cutter 74. The front end 80 of handle 58 can be grasped by a workman standing at the machine and can be reciprocated in the directions of arrows 82 to advance arm 42 into space 72 or to retract it therefrom. Since handle 58 is connected by rod 50, fitting 52 and crossbar 44 to arm 42 and is parallel thereto, movement of handle 58 in a given direction effects corresponding movement of arm 42.

It should be noted that a workman can manipulate both handle 58 and the sheets to be cut in machine 70 without changing his position next to machine 70. This facilitates the speed of operation of machine 70. It will also be noted that the height of arm 42 and extension member 62 are such that a sheet to be cut can be supported thereby from underneath in space 72. If a thicker or thinner sheet needs to be supported and cut, an adjustment in the height of extension member 62, particularly of limb 68 of angle iron 64, an be made easily by means of C-clamp 66. Thus, work holder 10 is readily adaptable to the cutting and shearing of various thicknesses of sheets. Brackets 38 and 40 could also be made adjustable in height (not shown) on members 18 and 20 so as to adjust the height of arm 42. Alternatively, shims can be clamped in brackets 38 and 40 to accomplish the same purpose. It will also be understood that the length of arm 42 also can be adjusted, as by substituting arms 42 of different lengths, or by making arm 42 telescopable (not shown) in order to provide the necessary sheet support at any desired location in space 72. In any event, work holder 10 performs efficiently, arm 42 holding ends of work sheets horizontally level during cutting thereof for proper cutting without binding. Moreover, arm 42 is easily movable from space 72 to permit removal of the cut sheet.

FIGS. 3 and 4

In FIGS. 3 and 4, there is schematically depicted a modification of the adjustable extension member of work holder 10, which modification can be used in place of member 62. Thus, end 60 of arm 42 is shown bearing a hinge 90 having a pair of short plates 92 and 94 connected thereto. Plate 92 is connected to end 60 and plate 94 is connected to an extension arm 96 which folds against arm 60 and which can be swung away in a horizontal plane to broaden the area of sheet support afforded thereby. The upper edges of hinge 90, plates 92 and 94, end 60 and end extension 96 are at about the same sheet supporting height. There is sufficient resistance in hinge 90 to the horizontal swinging or rotation of plates 92 and 94 and arm 96 so that arm 96 will remain in a predetermined position during repeated use of work holder 10, but can be forced into any other angle relative to end 60 when it is desired to do so. Hinge 90, plates 92 and 94 and arm extension 96 can be fabricated inexpensively of sheet or other metal or the like. Thus, the modification of FIGS. 3 and 4 imparts support adjustability to arm 60.

Although there have been described above specific arrangements of an improved work holder in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved work holder for use with a cutting or shearing machine, said work holder comprising, in combination:
   (a) a stationary base;
   (b) a plurality of spaced stationary upright supports secured to said base;
   (c) an adjustable translatable support arm mounted on and movable relative to said upright supports;
   (d) ground traverse means connected to said arm and including handle means for advancing said arm into a workpiece support position and for retracting said arm from said workpiece support position, said ground traverse means further being spaced laterally of said arm and including a generally vertical rod, a single wheel rotatably secured to the lower end thereof, and a crossbar secured to the upper end thereof and extending laterally to said arm, said handle extending forward of and secured to the upper end of said rod.

2. The improved work holder of claim 1 wherein there are two of said upright supports bearing support brackets adjacent the upper ends thereof, and wherein said arm is generally horizontal and is slidably disposed through said support brackets for reciprocation between the workpiece support position and the retracted position.

3. An improved work holder for use with a cutting or shearing machine, said work holder comprising, in combination:
   (a) a stationary base;
   (b) two spaced stationary upright supports secured to said base bearing support brackets adjacent the upper ends thereof;
   (c) an adjustable translatable support arm mounted on and movable relative to said upright supports, said support arm being generally horizontally and slidably disposed through said support brackets for reciprocation therein, wherein said support arm contains adjcent the forward end thereof an adjustable workpiece supporting extension member; and
   (d) ground traverse means connected to said arm and including handle means for advancing said arm into a workpiece support position and for retracting said arm from said workpiece support position, said ground traverse means being spaced laterally of said arm and including a generally vertical rod, a single wheel rotatably secured to the lower end thereof, and a crossbar secured to the upper end thereof and extending laterally to said arm, said handle extending forward of and secured to the upper end of said rod.

4. The improved work holder of claim 3, wherein said extension member comprises C-clamp means and an angled plate, vertically adjustable to accommodate said arm to workpieces of various thicknesses.

5. The improved work holder of claim 3 wherein said extension member comprises a hinge secured to said arm and an extension plate secured to said hinge for movement in a horizontal plane to narrow or broaden the area of support of a workpiece by said arm.

6. The improved work holder of claim 3 wherein said arm and adjustable member are dimensioned to fit between the cutter and backstop of a shearing machine to prevent bending of a thin flat flexible workpiece before and during cutting thereof.

7. The improved work holder of claim 6 wherein said base comprises a heavy tray in which the lower ends of said upright supports are secured.

8. The improved work holder of claim 7 wherein said tray has upraised sides and wherein there are two of said upright supports secured to each other by cross supports and to said sides by diagonal supports.

9. The improved work holder of claim 8 wherein said handle is disposed above said crossbar and extends at least as far forward of said work holder as does arm, and wherein said handle is adapted to extend above and across a workpiece so that a workman can manipulate said handle and arm while a workpiece is in place for cutting by a shearing machine.

* * * * *

UNITED STATES PATENT AND TRADEMARK OFFICE
CERTIFICATE OF CORRECTION

PATENT NO. : 4,410,023
DATED : October 18, 1983
INVENTOR(S) : Jesus G. Vasquez

It is certified that error appears in the above-identified patent and that said Letters Patent are hereby corrected as shown below:

On the front page, in the left hand column, between [76] and [21], insert --[73] Assignee: General Dynamics, Corporation Pomona, California --, and then Change [76] to --[75]--.

Signed and Sealed this

Twenty-ninth Day of May 1984

[SEAL]

Attest:

GERALD J. MOSSINGHOFF

Attesting Officer

Commissioner of Patents and Trademarks